(12) United States Patent
Behrendt et al.

(10) Patent No.: US 7,970,904 B2
(45) Date of Patent: Jun. 28, 2011

(54) METHOD AND COMPUTER PROGRAM PRODUCT FOR SELECTING AMONG MULTIPLE PROVISIONING MECHANISMS IN A SELF-MANAGING COMPUTER SYSTEM

(75) Inventors: Michael M. Behrendt, Boeblingen (DE); Tamar Eilam, New York, NY (US); Michael H. Kalantar, Chapel Hill, NC (US); Alexander V. Konstantinou, New York, NY (US); John A. Pershing, Jr., Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 12/118,787

(22) Filed: May 12, 2008

(65) Prior Publication Data

US 2008/0249970 A1    Oct. 9, 2008

Related U.S. Application Data

(63) Continuation of application No. 11/427,973, filed on Jun. 30, 2006, now abandoned.

(51) Int. Cl.
*G06F 15/173* (2006.01)
(52) U.S. Cl. ........................... 709/226; 709/223
(58) Field of Classification Search .................. 709/223, 709/226
See application file for complete search history.

(56) References Cited

U.S. PATENT DOCUMENTS

| | | | | |
|---|---|---|---|---|
| 7,516,457 | B2 * | 4/2009 | Eilam et al. | 718/104 |
| 2005/0066338 | A1 * | 3/2005 | Bloesch et al. | 719/328 |
| 2005/0163143 | A1 * | 7/2005 | Kalantar et al. | 370/431 |

OTHER PUBLICATIONS

Resnik, Philip, "Semantic Similarity in a Taxonomy: An Information-Based Measure and its Application to Problems of Ambiguity in Natural Language", Jul. 1999, retrieved from http://citeseerx.ist.psu.edu/viewdoc/summary?doi=10.1.1.50.3785 on Aug. 17, 2010.*
Eilam et al., "Managing the Configuration Complexity of Distributed Applications in Internet Data Centers", Mar. 2006, retrieved from http://ieeexplore.ieee.org/stamp/stamp.jsp?arnumber=01607881 on Feb. 13, 2009.*
Lin, Dekang, "An Information-Theoretic Definition of Similarity", 1998, retrieved from http://citeseerx.ist.psu.edu/viewdoc/summary?doi=10.1.1.55.1832 on Feb. 24, 2009.*
Eilam et al. "Managing the Configuration Complexity of Distributed Applications in Internet Data Centers", Mar. 2006, retrieved from http://ieeexplore.ieee.org/stamp/stamp.jsp?arnumber=01607881 on Feb. 13, 2009.
Lin, An Information-Theoretic Definiton of Similarity, 1998, retrieved from http://citeseerx.ist.psu.edu/viewdoc/summary?doi=10.1.1.55.1832 on Feb. 24, 2009.
Czajkowski, et al. "The WS-Resource Framework" Version 1.0. Mar. 5, 2004. pp. 1-18.
"Factory method pattern" from Wikipedia, the free encyclopedia. Internet Citing: http://en.wikipedia.org/wiki/Factory_method_pattern. 5 pages.

* cited by examiner

*Primary Examiner* — Joon H Hwang
*Assistant Examiner* — Thomas Lee
(74) *Attorney, Agent, or Firm* — Cantor Colburn LLP; Preston Young

(57) ABSTRACT

A computer implemented method and a computer program product provide a provisioning system for automated provisioning of a computing infrastructure by providing relationship factories with resources of the computing infrastructure. The relationship factories include information necessary for establishing relationships within the computing infrastructure. The provisioning system ranks relationship factories according to suitability to provide for appropriate provisioning of new resources added to the computing infrastructure.

12 Claims, 6 Drawing Sheets

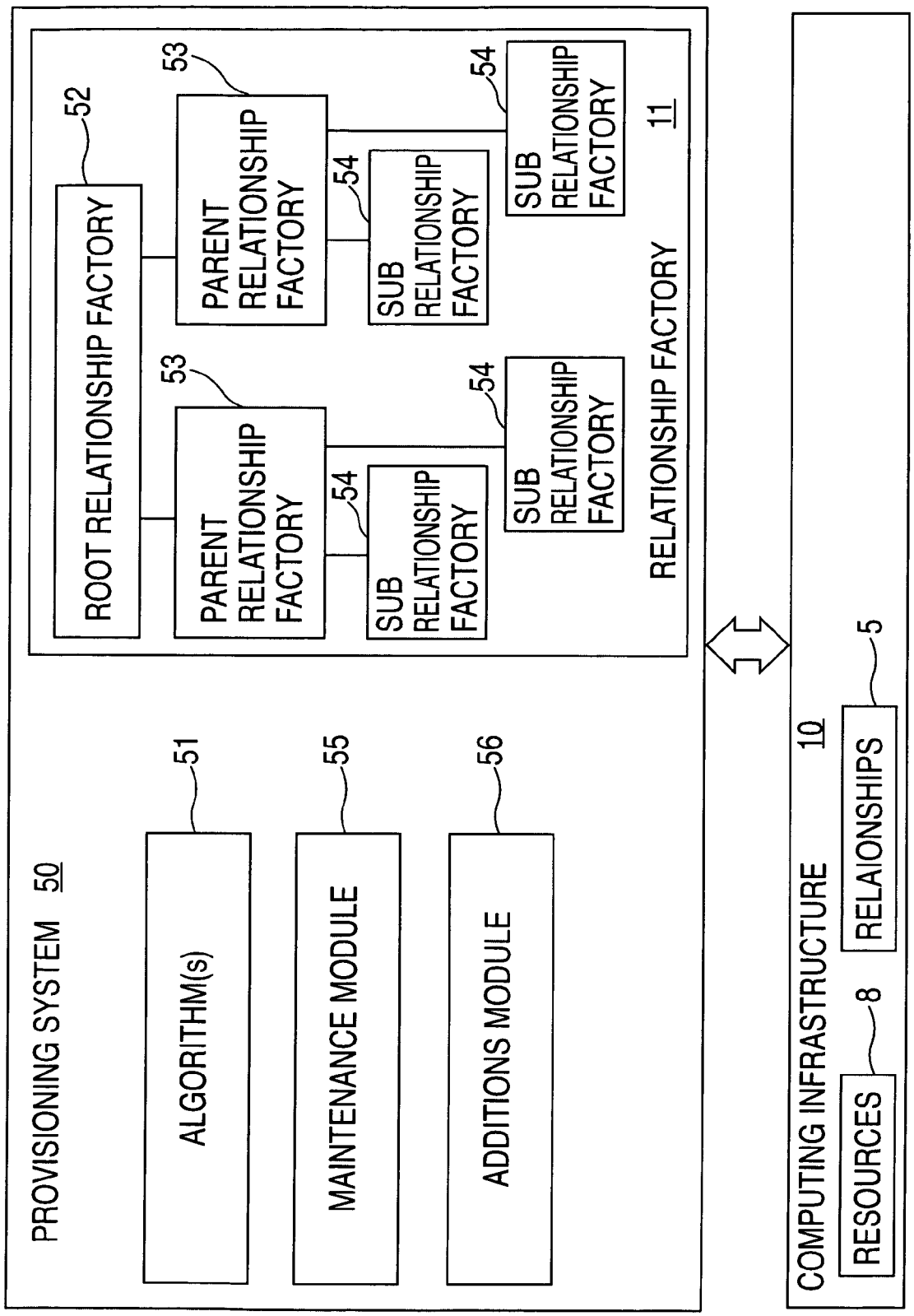

US 7,970,904 B2

METHOD AND COMPUTER PROGRAM PRODUCT FOR SELECTING AMONG MULTIPLE PROVISIONING MECHANISMS IN A SELF-MANAGING COMPUTER SYSTEM

CROSS REFERENCE TO RELATED APPLICATION

This application is a continuation application of U.S. Ser. No. 11/427,973, filed Jun. 30, 2006, the contents of which are incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The teachings herein are related to a computing infrastructure and more particularly to an automated system for self-provisioning.

2. Description of the Related Art

When a solution is deployed in a computing infrastructure, various components (for example, servers, operating systems, databases, applications, network connections, etc.) must be selected, installed, configured, and interconnected both physically and logically. Overall, this process is referred to as "provisioning." In a system which performs automated provisioning, one problem that needs to be addressed is the particular mechanism that is used to perform each of the provisioning actions (selection, installation, etc.). To date, provisioning has been at best a semi-automated process, in which a system administrator selects and/or modifies provisioning scripts based on his knowledge of the solution being deployed.

What is needed is a technique for automating provisioning in a computing infrastructure. Preferably, the technique provides for elimination of the administrator from the provisioning, at least by incorporating the knowledge of the administrator into the provisioning system.

SUMMARY OF THE INVENTION

The shortcomings of the prior art are overcome and additional advantages are provided through the provision of a computer implemented method for provisioning a new resource in a computing infrastructure, the method including identifying the new resource for addition to the computing infrastructure; identifying other resources of the computing infrastructure for relating to the new resource, each of the other resources having a relationship factory routine for establishing relationships; ranking each relationship factory according to a relationship of the respective other resource with the new resource; selecting a relationship factory for provisioning the new resource; and provisioning the new resource according to the relationship factory for provisioning.

A computer program product stored on machine readable media, the product having instructions for provisioning a new resource in a computing infrastructure, the instructions including: identifying the new resource added to the computing infrastructure; identifying other resources of the computing infrastructure for relating to the new resource, each of the other resources having a relationship factory for establishing relationships; ranking each relationship factory according to a relationship of the respective other resource with the new resource; selecting a relationship factory for provisioning the new resource; and provisioning the new resource according to the relationship factory for provisioning.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution in which a computer program product stored on machine readable media is provided, the product including instructions for provisioning a new resource in a computing infrastructure, the instructions for identifying the new resource added to the computing infrastructure; wherein the new resource has at least one of a server, operating system, database, application, network connection and adapter; identifying other resources of the computing infrastructure for relating to the new resource, each of the other resources having a relationship factory for establishing relationships; ranking each relationship factory in a hierarchy according to a relationship of the respective other resource with the new resource by calculating at least one of a source-endpoint distance and a target-endpoint distance in a recursive manner; selecting a relationship factory for provisioning the new resource; and provisioning the new resource according to the relationship factory for provisioning; wherein provisioning calls for registering a new relationship factory for the new resource and establishing at least one of a physical relationship and a logical relationship with the new resource.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 depicts aspects of a provisioning system.

The detailed description explains the preferred embodiments of the invention, together with advantages and features, by way of example with reference to the drawings.

DETAILED DESCRIPTION OF THE INVENTION

Figure 1:
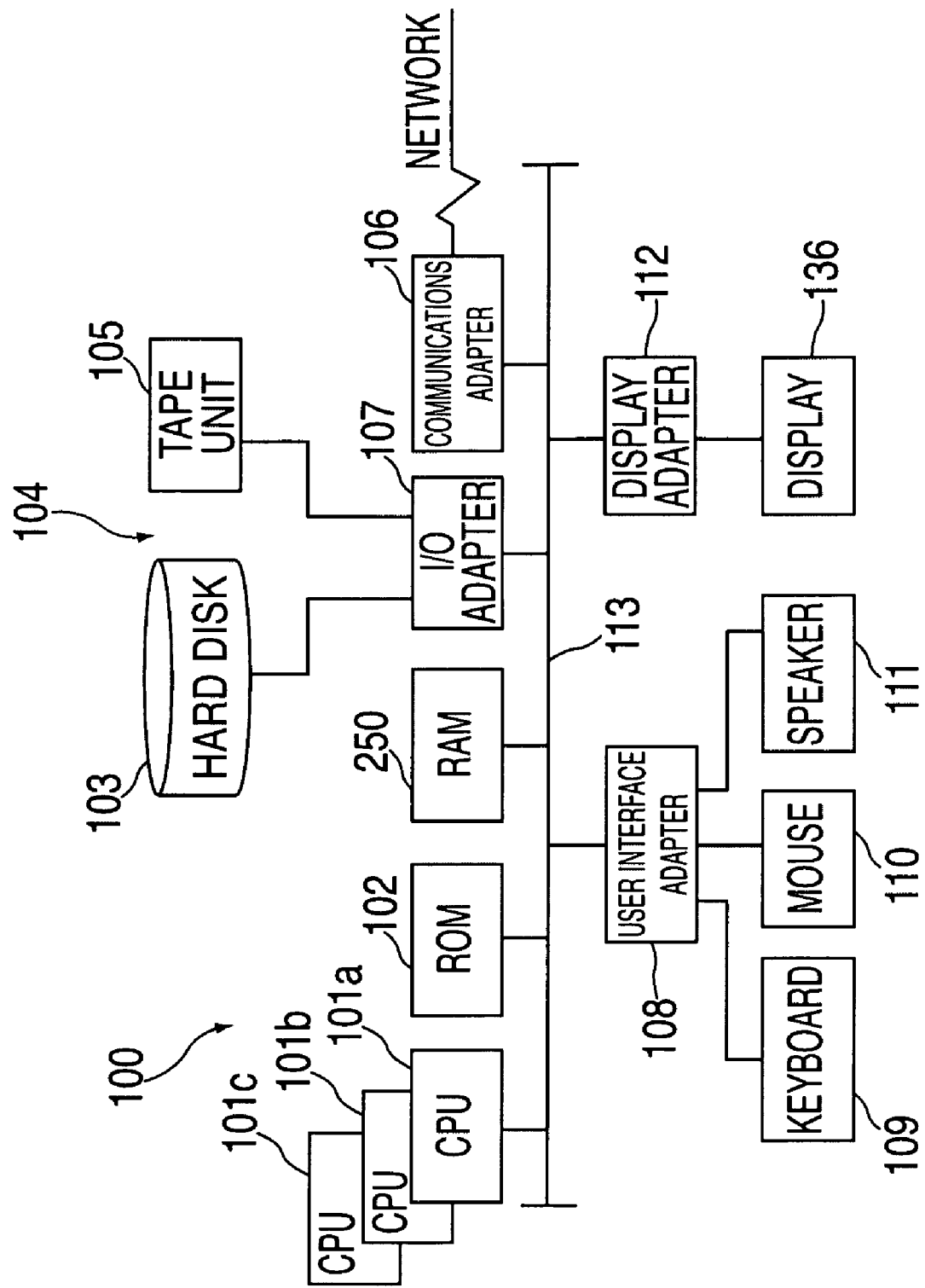
FIG. 1 illustrates aspects of resources for a computing infrastructure.

Referring now to FIG. 1, an embodiment of a data processing system 100 is depicted. System 100 has one or more central processing units (processors) 101a, 101b, 101c, etc. (collectively or generically referred to as processor(s) 101). Processors 101 are coupled to system memory 250 and various other components via a system bus 113. Read only memory (ROM) 102 is coupled to the system bus 113 and may include a basic input/output system (BIOS), which controls certain basic functions of system 100.

FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI) bus. Additional input/output devices are shown as connected to system bus 113 via user interface adapter 108 and display adapter 112. A keyboard 109, mouse 110, and speaker 111 all interconnected to bus 113 via user interface adapter 108 may be included.

Thus, as configured FIG. 1, the system 100 includes a variety of resources and a variety of relationships between the resources. Clearly, one skilled in the art will recognize that the system 100 of FIG. 1 is a vastly simplified sketch of components that may only be a part of a computing infrastructure.

One skilled in the art will recognize that the system 100 depicted in FIG. 1 represents only a fraction of the resources and the relationships provided in a typical computer infrastructure. For example, in the typical computer infrastructure, other components such as network connections, routers, bridges, firewalls, switches, servers, middleware and other components as are known in the art may be available. Accordingly, it should be understood that as discussed herein, the computer infrastructure may include any one or all of such components. The computer infrastructure provides an environment for the teachings herein.

Figure 2:
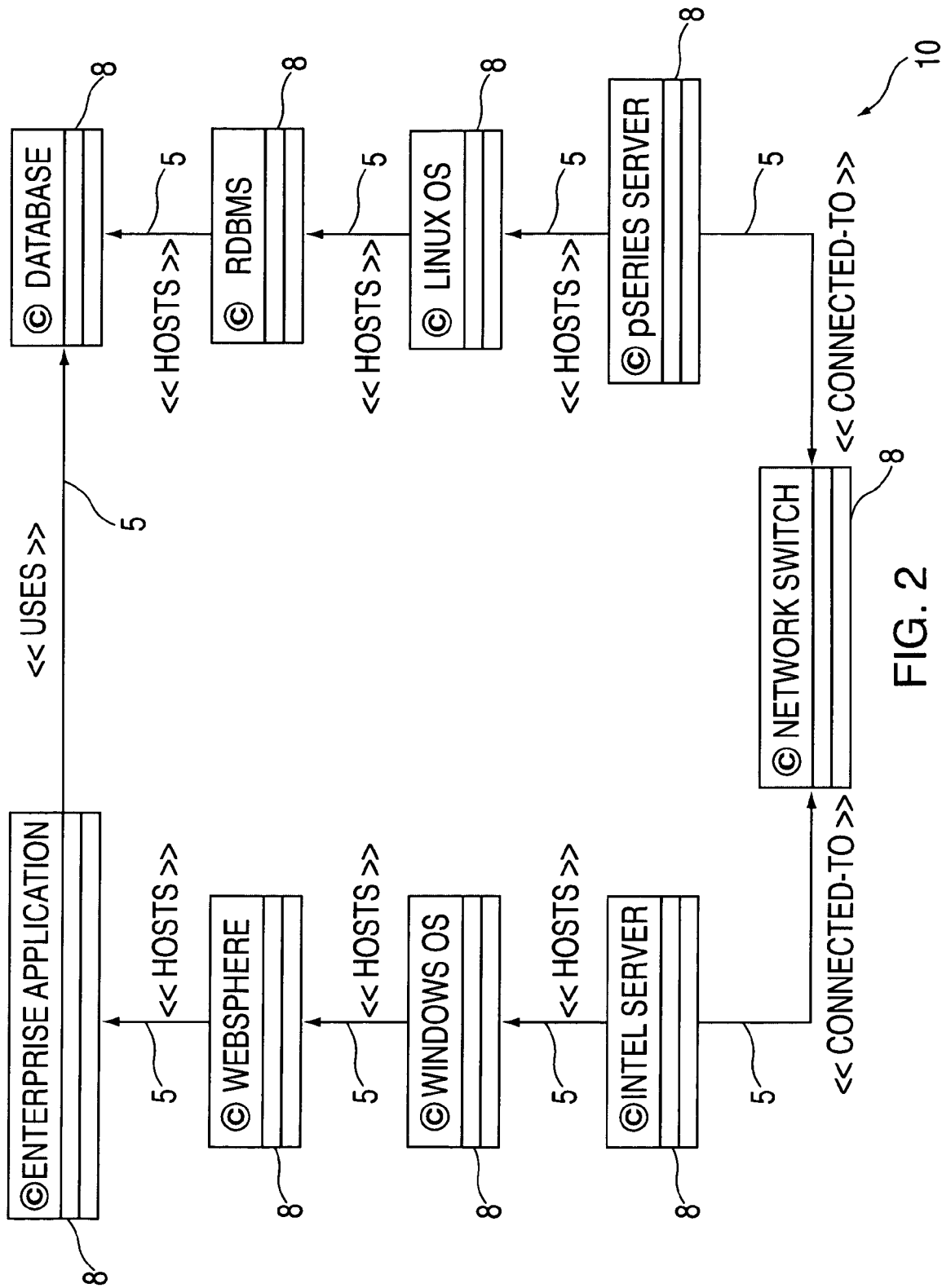
FIG. 2 illustrates resources and relationships in a computing infrastructure.

Referring now to FIG. 2, there are shown aspects of a computer infrastructure 10 where nodes represent resources 8 (services) of the computing infrastructure (e.g., servers, operating systems, databases) and relationships 5 among those resources 8 are depicted. The relationships 5 may include a variety of associations. For example, one relationship 5 includes a server hosting an operating system; another relationship 5 includes an operating system hosting an instance of WebSphere; and a third relationship 5 includes a WebSphere hosting an enterprise application. The teachings herein provide for associating different instances of relationships 5 with specific provisioning agents and actions, depending on the type of the relationship 5 and the characteristics of the two related resources 8.

When a solution (i.e., the resource 8) is deployed into a computing infrastructure 10, the various components of that solution (servers, operating systems, databases, applications, network connections, adapter etc.) must be selected, installed, configured, and interconnected both physically and logically. This installation process is generally referred to as "provisioning". In a system that performs automated provisioning of resources 8, one problem that needs to be addressed is the particular mechanism that is used to perform each of the provisioning actions (selection, installation, etc.). Some efforts have provided for provisioning as a semi-automated process, in which a system administrator at least one of selects and modifies provisioning scripts based on his knowledge of the solution being deployed.

The teachings herein provide for elimination of aspects of the administrator functions from provisioning, and applies knowledge of the administrator to the provisioning system.

As disclosed herein, aspects of prior art technologies are applied to address automated provisioning. The "Factory Pattern", well known in the art of object-oriented programming, serves, in part, as a basis for design of the teachings disclosed herein.

The techniques of the present invention provide for, among other things: specific provisioning agents that are registered as relationship factories for establishing particular relationships 5; and a search algorithm and use thereof for selecting a correct provisioning agent to establish a desired relationship 5. Typically, relationship factories are maintained as at least executable module written in some suitable programming language. The at least one executable module typically accompanies a resource 8, such as in the form of a driver.

Each of the relationship factories includes information necessary for establishing aspects of a given relationship 5. For example, each relationship factory includes aspects of information typically known to or maintained by an administrator. Exemplary aspects include requirements for establishing logical and physical relationships with the associated resource 8.

Figure 3:
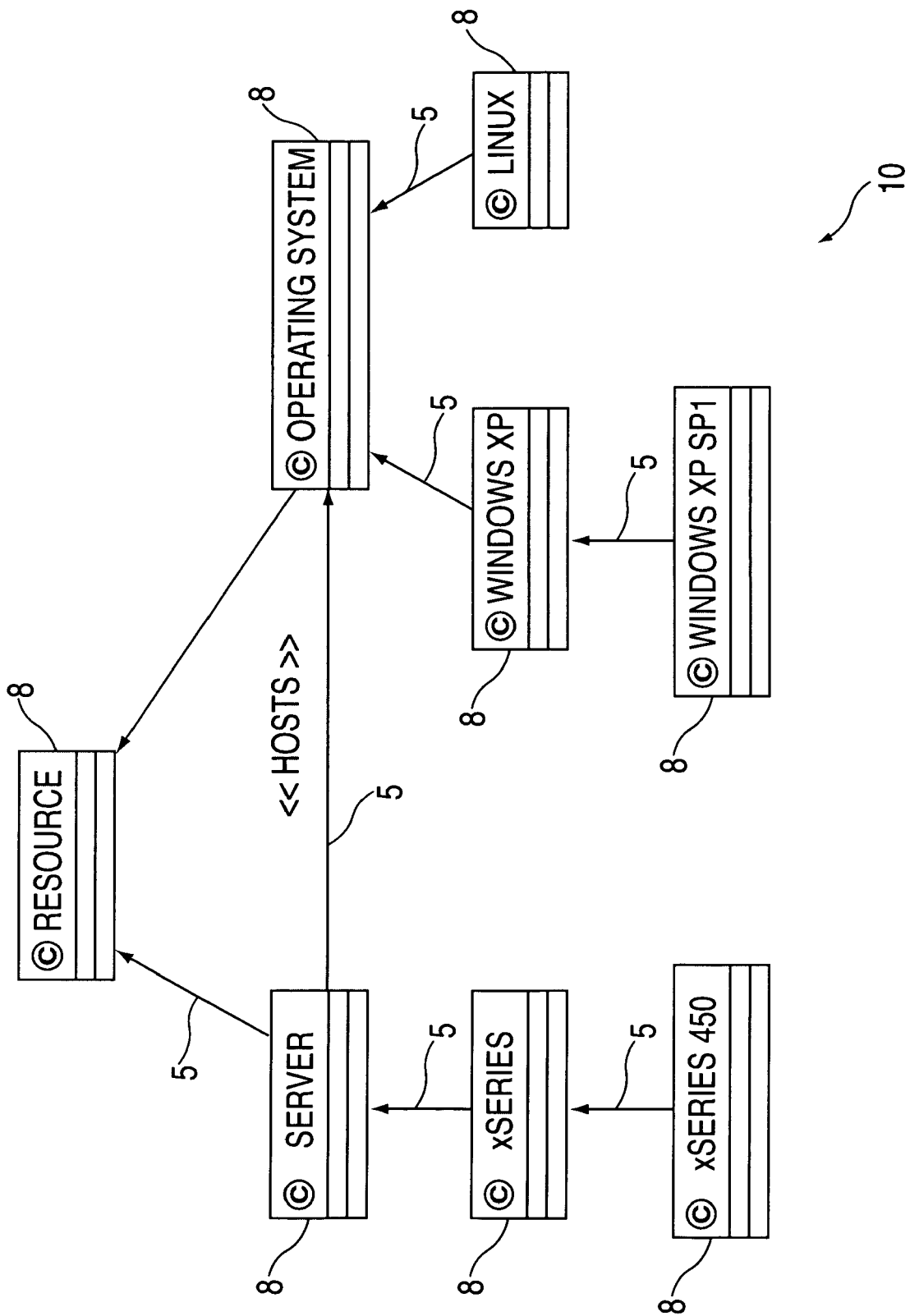
FIG. 3 illustrates part of an inheritance hierarchy of resource types in a computing infrastructure.

Consider the following non-limiting example depicted in FIG. 3. In FIG. 3, resources 8 and relationships 5 are described. First, assume that there is an inheritance hierarchy among all of the types of resources 8 that are used in the computing infrastructure 10. For example, a top-level resource type might just be named "Resource." Additionally, "Servers" and "OperatingSystems" are "Resources." "Windows XP®" and "Linux®" are both "OperatingSystems"; while "xSeries" is a "Server." In this example, "Server" is to host to "OperatingSystem." Accordingly, there is a "hosts" relationship 5 between "Server" and "OperatingSystem" (and, by implication, to all respective subtypes). This also describes a potential relationship 5 in that the "xSeries®" might be able to host "Windows XP®" or "Linux®", since each are subtypes of "Server" and "OperatingSystem" respectively.

Note that in a typical computing infrastructure 10, there are numerous different resource types. The number of possible relationships 5 increases greatly as the number of resource types grows. Hence, it has not been possible to have knowledge of how to establish every aspect of each of these possible relationships 5. This problem has been exacerbated by dynamic introduction of resources 8. In these instances, provisioning knowledge for these new resources 8 needs to be dynamically introduced. Therefore, a flexible and generalized system is need to provide for automated provisioning.

Accordingly, a concept referred to as a "relationship factory" is provided herein as a technique for automated provisioning. Relationship factories include, among other things, the knowledge required for the establishment of a certain relationship type between two certain resource types. Each relationship factory may have an arbitrary number of sub-factories. Typically, each sub-factory is registered with a respective parent relationship factory. Registration is usually performed during runtime by calling the registers ( ) method for the parent relationship factory, where the relationship factory, which is to be registered, is passed as a parameter along with the relationship type (e.g., "hosts") and the pair of resource types (e.g., "Server", "OperatingSystem") that are handled by this relationship factory. The result is a tree of relationship factories, where one relationship factory provides a root relationship factory. The root relationship factory is typically the starting point for any relationship establishment operations.

In the following non-limiting example, and with reference to FIG. 4, there is a relationship factory 11 referred to as a "HostsRelationshipFactory", which includes information regarding how to establish a "hosts" relationship 5 between two arbitrary resources 8. In this example, the "HostsRelationshipFactory" has limited and generic information. Included is another relationship factory 11, referred to as a "xSeriesHostsOperatingSystemRelationshipFactory", which has further specialized information regarding how to establish the "hosts" relationship. For example, the further specialized information may be directed to a "hosts" relationship 5 between "xSeries®" and "OperatingSystem." In this example, both the "HostsRelationshipFactory" and the "xSeriesHostsOperatingSystemRelationshipFactory" relationship factories 11 are registered at a top-level Relationship Factory. In this example, the top-level relationship factory 11 is referred to as the "RootRelationshipFactory." The "RootRelationshipFactory" is not illustrated for purposes of simplicity.

At this point in the provisioning process, an algorithm is used to search the relationship factories 11 to build appropriate relationships 5. For example, when it comes to the point in the provisioning process when a hosts relationship 5 between a resource 8 of the type "xSeries®" and a resource 8 of the type "Windows XP®" has to be established, a method like createRelationship ("Hosts", "xSeries®," "Windows XP®") is invoked on the factory "RootRelationshipFactory." This initiates a search over all of registered sub-relationship factories to find the one that is most suitable.

In this example, a first step involves examining the "HostsRelationshipFactory" to determine how well this relationship factory addresses the task of establishing this relationship 5. As previously discussed, the "HostsRelationshipFactory" contains information regarding how to establish a "hosts" relationship between two resources 8.

In order to determine a goodness of fit, suitability of the relationship factory 11 is ranked. Note that each level of inheritance (see FIG. 3) has a certain level; the root has level zero, all children of the root have level one, the children of these children have a level of two, and so forth.

Figure 5:
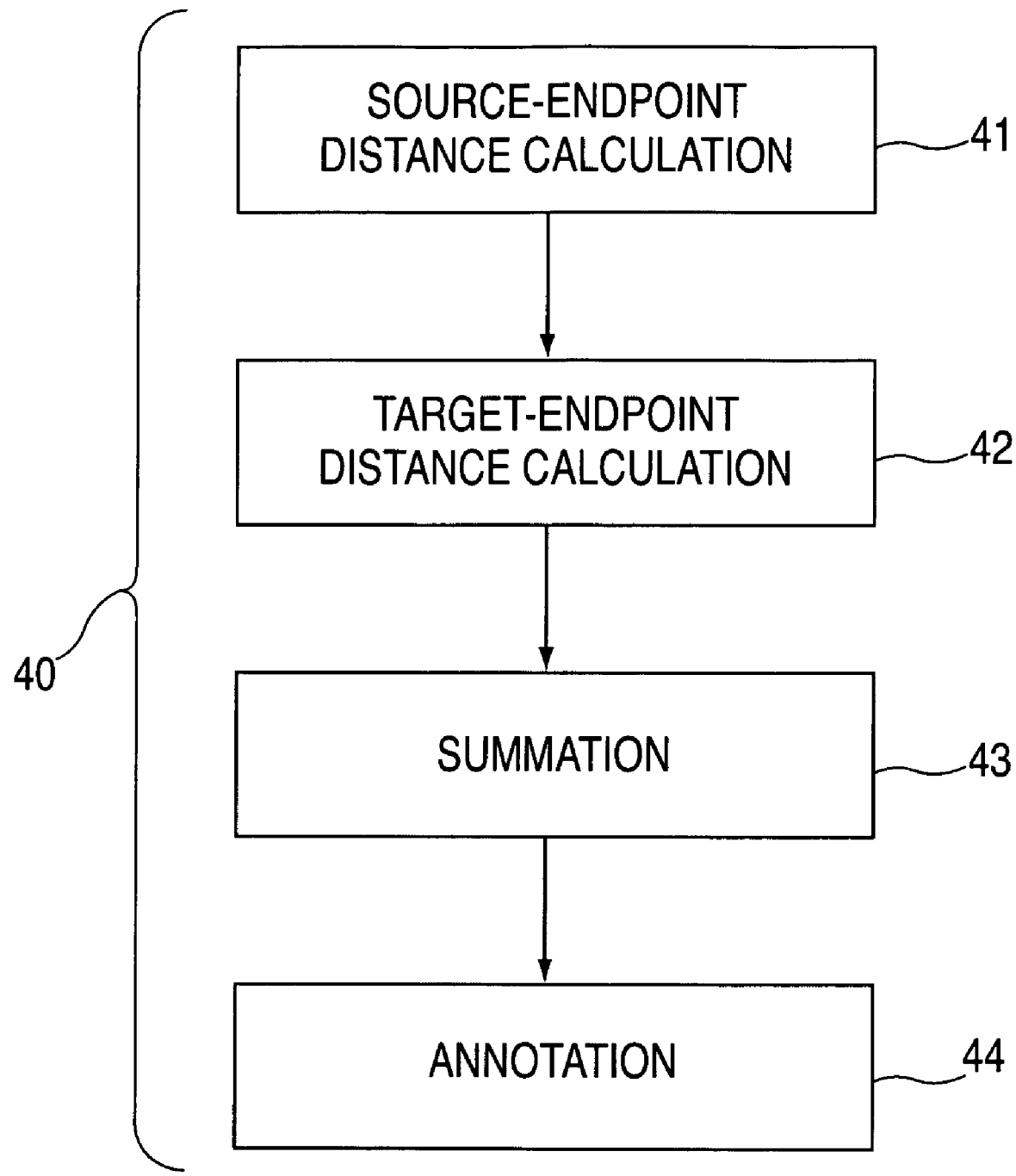
FIG. 5 illustrates an exemplary method for ranking relationship factories.

Referring to FIG. 5, an exemplary method for ranking 40 is depicted. As a first step in ranking 40, source-endpoint distance (SED) calculation 41 is conducted. In the source-endpoint distance calculation 41, the source-endpoint distance (SED) from the source-endpoint resource type ("xSeries®") to the source-endpoint of the relationship factory type (Resource) is calculated:

$$SED="xSeries-Resource"=2-0=2 \quad (1).$$

As a second step in ranking 40, a target-endpoint distance (TED) calculation 42 is conducted. In the target-endpoint distance calculation 42, a target-endpoint distance (TED) from the target-endpoint resource type ("Windows XP®") to the target-endpoint of the relationship factory type (Resource) is calculated:

$$TED="Windows\ XP"-"Resource"=2-0=2 \quad (2).$$

As a third step in ranking 40, summation 43 is conducted. In summation 43, the sum of the two results is calculated:

$$Sum=SED+TED=2+2=4 \quad (3).$$

It is important to ensure that each of the intermediate results (the SED and the TED) are not less than 0. Where either of the SED and the TED are less than zero, selection of the designated relationship factory 11 can be canceled (this relationship factory 11 is too specialized for the given resource 8).

Once summation 43 is completed, annotation 44 is used to supply each relationship factory 11 with a rank. In typical embodiments, the larger the result of summation 43 is, the lower the suitability of the selected relationship factory 11 for establishing the desired relationship type between two given resources 8. From the ranking 40, a best suited relationship factory 11 is identified.

Figure 4:
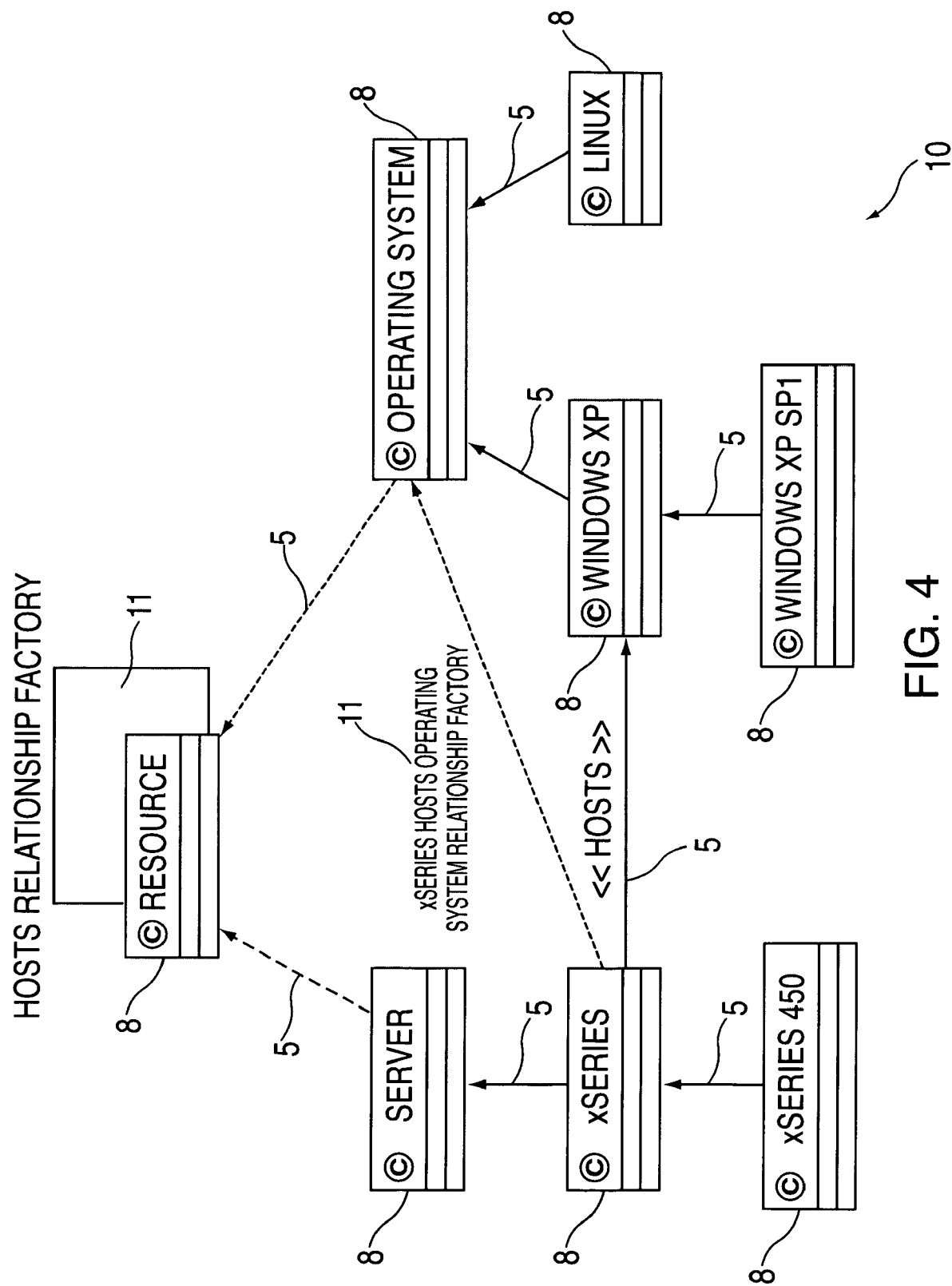
FIG. 4 illustrates resources, relationships and relationship factories for enhancing the computing infrastructure.

Consider again FIG. 4, and evaluation of the "xSeriesHostsOperatingSystemRelationshipFactory":

$$SED="xSeries"-"xSeries"=0$$

$$TED="Windows\ XP"-"OperatingSystem"=1$$

$$Sum=SED+TED=0+1=1$$

Since 1<4 the "xSeriesHostsOperatingSystemRelationshipFactory" is selected as a preferred relationship factory 11 over the "HostsRelationshipFactory."

In this simplified example, the search ends at this point as there are no more relationship factories 11 available. However, in other more realistic embodiments, numerous relationship factories 11 are evaluated by ranking 40. In the general case, after the best-suited relationship factory 11 has been found, the search process continues and provides for evaluation of all the sub-relationship factories for the best suited relationship factory 11. This is typically performed in a recursive manner until the relationship factory for provisioning has been found. Once identified, the relationship factory for provisioning is then applied to provide for provisioning of the solution.

As a matter of course, the teachings herein may be applied to any resource types and any relationship types.

The capabilities of the present invention can be implemented in software, firmware, hardware or some combination thereof. As one example, the system for provisioning, including algorithms, relationship factories and other associated aspects may be implemented in software using various hardware components. In some embodiments, the software is designed to propagate automatically throughout the computer infrastructure 10. In some of these embodiments, automatic recognition features may be included. For example, the provisioning system may include an index for associating certain relationship factories 11 with correlating resources 8 in the background.

Exemplary components of the provisioning system are depicted in FIG. 6. In FIG. 6, the provisioning system 50 includes at least one algorithm 51. The at least one algorithm 51 provides for, among other things, ranking 40 of the various relationship factories. The provisioning system 50 includes other modules as necessary. Non-limiting examples of other modules including a maintenance module 55, an additions module 56, a registration module 57 and others. Exemplary functions of the maintenance module 55 include updating of structures for the relationship factory 11 and others. Exemplary functions for the additions module 56 include obtaining information for establishing relationship factories, and associating a relationship factory 11 with a given resource 8.

Exemplary functions for the registration module 57 include registering of each relationship factory 11. Other modules may be included as deemed suitable.

The relationship factory 11 includes various components, non-limiting examples including the root relationship factory 52, a plurality of parent relationship factories 53 (each parent relationship factory 53 having a plurality of sub-relationship factories 54). As one can see by the diagram in FIG. 6, the relationship factory 11 may include a tree structure that is useful for searching the hierarchy of the various relationship factories. The provisioning system 50 draws on resources 8 of the computing infrastructure 10 for operation, and enhances the relationships 5 of the computing infrastructure 10 in accordance with the teachings herein.

One or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for provisioning a new resource in a computing infrastructure, the method comprising:
   identifying the new resource for addition to the computing infrastructure;
   identifying other resources of the computing infrastructure for relating to the new resource, each of the other resources comprising a relationship factory for establishing relationships;
   ranking each relationship factory according to a relationship of the respective other resource with the new resource, the ranking comprises calculating at least one of a source-endpoint distance between a source-endpoint resource type and an endpoint of a relationship factory type and a target-endpoint distance between a target-endpoint resource type and an endpoint of a relationship factory type;
   selecting a relationship factory for provisioning the new resource; and
   provisioning the new resource according to the relationship factory for provisioning.

2. The computer implemented method as in claim 1, wherein provisioning comprises registering a new relationship factory for the new resource.

3. The computer implemented method as in claim 1, wherein provisioning comprises at least one of establishing a physical relationship and a logical relationship with the new resource.

4. The computer implemented method as in claim 1, wherein the new resource comprises at least one of a server, operating system, database, application, network connection and adapter.

5. The computer implemented method as in claim 1, wherein relationship factories are arranged according to a hierarchy.

6. The computer implemented method as in claim 1, wherein ranking comprises a recursive evaluation of each of the relationship factories.

7. A computer program product stored on non-transitory machine readable media, the product comprising instructions for provisioning a new resource in a computing infrastructure, the instructions comprising:
   identifying the new resource added to the computing infrastructure;
   identifying other resources of the computing infrastructure for relating to the new resource, each of the other resources comprising a relationship factory for establishing relationships;
   ranking each relationship factory according to a relationship of the respective other resource with the new resource, the ranking comprises calculating at least one of a source-endpoint distance between a source-endpoint resource type and an endpoint of a relationship factory type and a target-endpoint distance between a target-endpoint resource type and an endpoint of a relationship factory type;
   selecting a relationship factory for provisioning the new resource; and
   provisioning the new resource according to the relationship factory for provisioning.

8. The computer program product as in claim 7, wherein provisioning comprises registering a new relationship factory for the new resource.

9. The computer program product as in claim 7, wherein provisioning comprises at least one of establishing a physical relationship and a logical relationship with the new resource.

10. The computer program product as in claim 7, wherein the new resource comprises at least one of a server, operating system, database, application, network connection and adapter.

11. The computer program product as in claim 7, wherein relationship factories are arranged according to a hierarchy.

12. The computer program product as in claim 7, wherein ranking comprises a recursive evaluation of each of the relationship factories.

* * * * *